(No Model.)
A. W. WALKER.
ANIMAL TRAP.
No. 255,059. Patented Mar. 14, 1882.
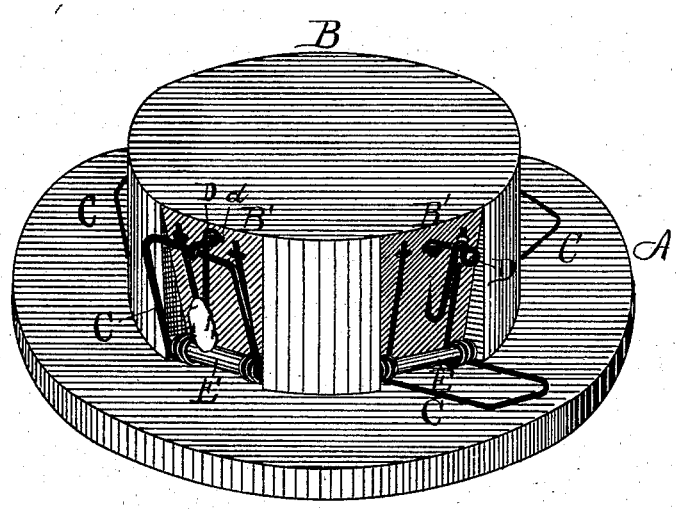
Witnesses
Cyrus F. Dean
R. H. Humphrey
Inventor
A. W. Walker
per Hallock & Hallock
Att'y

UNITED STATES PATENT OFFICE.

ADDISON W. WALKER, OF ERIE, PENNSYLVANIA.

ANIMAL-TRAP.

SPECIFICATION forming part of Letters Patent No. 255,059, dated March 14, 1882.

Application filed January 6, 1881. (No model.)

*To all whom it may concern:*

Be it known that I, ADDISON W. WALKER, of Erie, Erie county, Pennsylvania, have invented new and useful Improvements in Animal-Traps; and I do hereby declare that the following is a full, clear, and exact description thereof, reference being had to the accompanying drawing and the letters or figures of reference marked thereon.
My invention relates to that class of animal-traps wherein the animal is caught beneath a spring-fall, which spring-fall, when the trap is set, is held in place by a trigger device to which the bait is attached. My invention consists in various improvements in the construction thereof, which will fully appear in the following description, and will be specifically pointed out in the appended claim.

My device is shown in the accompanying drawing by a perspective view thereof.

A is a circular base-board, and B is a circular center block, in which are recesses B' B', &c., on its periphery. The two pieces A and B may, however, be many sided—as, for example, six, eight, or ten square—and each face of the central block may be provided with a recess, B'. The circular form, however, is the best, as it is the cheapest to make. The central block is placed so as to leave a ledge or shelf formed by the base-block. The central block serves as a backing for the spring-falls, and the ledge around it, just named, serves as the lower jaw of the trap. The chief merit in this construction is its cheapness and the rapidity with which it can be constructed. The two blocks A and B are formed by machinery, and are attached together by a single nail or screw, if desired. The recesses B' are made with outwardly-inclining backs, so that they are deeper at the base than on top. In the drawing they are shown as having no depth at the top; but they may have, if desired. The spring-falls C C C, &c., are adjusted in these recesses B'. The object in having the recesses is to set the base of the spring-fall back within the block B, so that the animal cannot approach the bait from the rear, and where the central block is round it gives a flat smooth surface on which to adjust the spring-fall. It is not essential that the back of the recess shall be inclined outwardly, as is shown. The spring-falls are arranged to drop outside of the walls of the block B, so that any animal which tries to take the bait either from the sides or the front will be struck either by the side bars or the cross-piece.

The recesses and spring-falls may be close together or far apart, as it may be desired to have few or many, and the larger the base and center block are the more spring-falls there may be. Where only two or four are wanted the base and center block may be square, which form is as easily and cheaply made as round.

The spring-falls C C, &c., are of ordinary construction, and they are attached in place by any convenient means.

The triggers D D, &c., consist of a hook pivoted to the back of the recess and adapted to hook over the spring-fall when raised, as is shown on the left of the figure. This hook has an arm extending downward and terminating in a bait-hook. The arm and the trigger-hook are connected rigidly, or are, as shown in the drawing, made of one piece of wire. Two forms are shown in the drawing. The one shown on the right of the drawing has the bait-arm extending out from a point near the hook which engages the spring-fall and the bait-hook turns toward the block B. On the left of the drawing the bait-arm extends down from the point where the trigger is pivoted to the block, and the bait-hook bends outwardly. Either form is simple and effective, and easily set and easily sprung. Either form is in effect and may be described as an elbow or bell-crank lever provided with a bait-hook on one of its arms, and with a trigger-hook and a pivot-loop respectively at either the angle or the end of the other arm, as desired, and attached to the back of the trap in such a position that it may properly engage the spring-fall when it is raised and disengage it when the bait-hook is pulled outwardly from the back of the trap.

This trap will be efficient in catching many of the smaller animals—such as rats and mice, musk-rats, rabbits, mink, &c.—according to the size of the trap. In construction it is exceedingly simple and cheap, which is the chief object of the invention.
I am aware of Patent No. 148,194, which shows a block having a series of falls arranged and adapted to drop wholly within the recesses in which the operating mechanism is fixed, and this I do not claim.

I am also aware of Patent No. 74,762, of 1868, (and of many others similar,) which shows a back and base with a spring-fall; but these are elements which I do not claim, nor do these devices show my construction.

What I claim as new is—

An animal-trap consisting of a base-block, A, having a block, B, of less diameter attached centrally thereto, thus forming a circumferential ledge or shelf, in combination with a series of spring-falls which have their triggers on said block B, and when sprung fall upon said ledge, substantially as shown.

In testimony that I claim the foregoing I have hereunto set my hand this 18th day of December, 1880.

ADDISON W. WALKER.

Witnesses:
   JNO. K. HALLOCK,
   SAM. WOODS.